United States Patent
Krishnappa et al.

(10) Patent No.: US 8,975,954 B2
(45) Date of Patent: Mar. 10, 2015

(54) METHOD FOR PERFORMING ADAPTIVE VOLTAGE SCALING (AVS) AND INTEGRATED CIRCUIT CONFIGURED TO PERFORM AVS

(71) Applicant: QUALCOMM Incorporated, San Diego, CA (US)

(72) Inventors: Madan Krishnappa, San Diego, CA (US); Stephen Simmonds, San Diego, CA (US); Parag Arun Agashe, San Diego, CA (US); Sajjad Pagarkar, San Diego, CA (US); Ashwin Rabindranath, San Diego, CA (US); Sagar Digwalekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/736,295

(22) Filed: Jan. 8, 2013

(65) Prior Publication Data

US 2014/0191794 A1      Jul. 10, 2014

(51) Int. Cl.
*G05F 1/10*     (2006.01)
*G05F 3/02*     (2006.01)
*G06F 1/32*     (2006.01)

(52) U.S. Cl.
CPC ............... *G05F 1/10* (2013.01); *G06F 1/3296* (2013.01); *G06F 1/3206* (2013.01)
USPC .......................... 327/538; 327/544; 327/540

(58) Field of Classification Search
USPC ............................. 327/530–546; 323/312–317
See application file for complete search history.

(56) References Cited

U.S. PATENT DOCUMENTS

| | | | |
|---|---|---|---|
| 6,731,139 B1 * | 5/2004 | Wert et al. | 327/49 |
| 6,928,559 B1 | 8/2005 | Beard | |
| 7,417,482 B2 * | 8/2008 | Elgebaly et al. | 327/278 |
| 7,469,355 B1 | 12/2008 | Chong | |
| 7,581,120 B1 | 8/2009 | Hartman et al. | |
| 8,230,239 B2 | 7/2012 | Wang et al. | |
| 2007/0096775 A1 * | 5/2007 | Elgebaly et al. | 327/105 |
| 2008/0036613 A1 | 2/2008 | Gaskins et al. | |
| 2009/0206904 A1 * | 8/2009 | Shimura | 327/199 |
| 2010/0289553 A1 | 11/2010 | Wang | |
| 2011/0068858 A1 * | 3/2011 | Chawla et al. | 327/538 |
| 2012/0075005 A1 | 3/2012 | Flores et al. | |
| 2012/0124402 A1 | 5/2012 | Vanderwiel | |

FOREIGN PATENT DOCUMENTS

WO    WO-2012058202 A1    5/2012

OTHER PUBLICATIONS

International Search Report and Written Opinion—PCT/US2014/010551—ISA/EPO—Mar. 25, 2014.

* cited by examiner

*Primary Examiner* — Brandon S Cole
(74) *Attorney, Agent, or Firm* — Muncy, Geissler, Olds & Lowe, P.C.

(57) ABSTRACT

An integrated circuit (IC) includes an adaptive voltage scaling (AVS) controller configured to control a voltage supplied to a portion of the IC and at least one sensor configured to sense at least one state of the IC and to provide an output signal indicative of the at least one sensed state to the AVS controller, the IC having a first setting and a second setting, the AVS controller being configured to use the output signal to control the voltage in the first setting and the AVS controller being configured to control the voltage independently of the output signal in the second setting. Also a method of performing AVS is provided.

44 Claims, 3 Drawing Sheets

METHOD FOR PERFORMING ADAPTIVE VOLTAGE SCALING (AVS) AND INTEGRATED CIRCUIT CONFIGURED TO PERFORM AVS

FIELD OF THE DISCLOSURE

The present disclosure is directed to a method for performing an adaptive voltage scaling (AVS) operation and to an integrated circuit that employs the method and, more specifically, toward a method of performing an AVS operation under certain conditions and not performing the AVS operation under other conditions and to an integrated circuit that employs the method.

BACKGROUND OF THE DISCLOSURE

Integrated circuits (IC's) are designed to operate at a certain speed at a given nominal voltage. Due to variations in the materials used and/or in a fabrication process by which they are formed, IC's that are intended to be identical may operate at different speeds when supplied with the nominal voltage. The speeds of individual devices may be determined during production testing, and an indication related to the speed of a particular device may be stored on the IC in a non-volatile manner. For example, it is known to store information related to the speed of an IC in one-time programmable registers such as fuse bits. The stored information may identify the actual voltage that is required for the particular IC to perform at its rated operating speed or it may identify an offset or delta from the nominal operating voltage.

A given IC may include an adaptive voltage scaling (AVS) controller that controls the voltage at which a portion of the IC operates. The AVS controller may, for example, read information about an operating voltage that was stored in the IC during production testing and control the operating voltage of the IC accordingly. AVS controllers may also use information about the state of the IC and/or its environment to control a voltage. For example, certain IC's may operate faster as the temperature of the IC increases. An AVS controller will thus reduce the voltage supplied to that IC when a temperature increase is detected and increase the voltage when a temperature decease is detected. Other operating states, such as the frequency at which a portion of the IC is operating, may also affect power consumption, and the AVS controller may monitor these states and control a voltage provided to the IC as the various monitored states change.

While conventional AVS controllers can provide power savings by reducing a voltage supplied to a portion of an IC, such savings require processing power to achieve. That is, a processor on the IC must analyze sensor signals and make the desired voltage adjustments. Thus reducing power consumption can also reduce the performance of the IC or a device controlled by the IC. It would therefore be desirable to provide a method and system of AVS that has a reduced impact on system performance.

SUMMARY

An exemplary embodiment includes a method of power management that comprises providing an integrated circuit (IC) having an adaptive voltage scaling (AVS) controller, performing a first AVS operation on a voltage supplied to a portion of the IC using the AVS controller under a first condition, and not performing the first AVS operation on the voltage supplied to the portion of the IC under a second condition.

Another embodiment includes an IC that comprises an AVS controller configured to control a voltage supplied to a portion of the IC and at least one sensor configured to sense at least one state of the IC and to provide an output signal indicative of the at least one sensed state to the AVS controller. The IC has a first setting and a second setting, and the AVS controller is configured to use the output signal to control the voltage in the first setting and to control the voltage independently of the output signal in the second setting.

A further embodiment includes a method that comprises providing an IC having a nominal operating voltage and an AVS controller configured to control a voltage provided to a portion of the IC, determining a power saving operating voltage for the IC different than the nominal operating voltage and storing an indication of the power saving operating voltage on the IC. The method further includes sensing a state of the IC, performing a first AVS operation on the voltage provided to the portion of the IC based on the power saving operating voltage and the sensed state of the IC under a first condition and performing a second AVS operation on the voltage provided to the portion of the IC based on the power saving operating voltage independently of the sensed state of the IC under a second condition.

Still another embodiment comprises a method of power management that includes step for providing an IC having an AVS controller, step for performing a first AVS operation on a voltage supplied to a portion of the IC using the AVS controller under a first condition, and step for not performing the first AVS operation on the voltage supplied to the portion of the IC under a second condition.

Still a further embodiment comprises an IC having an AVS controller and including means for performing a first AVS operation on a voltage supplied to a portion of the IC using the AVS controller under a first condition and means for preventing the performance of the first AVS operation on the voltage supplied to the portion of the IC under a second condition.

Another embodiment comprises an IC that includes means for controlling a voltage supplied to a portion of the IC, means for sensing at least one state of the IC and means for providing an output signal indicative of the at least one sensed state to the means for controlling. The IC has a first setting and a second setting, the means for controlling is configured to use the output signal to control the voltage in the first setting and the means for controlling is configured to control the voltage independently of the output signal in the second setting.

A further embodiment comprises a method that includes step for providing an IC having a nominal operating voltage and an AVS controller configured to control a voltage provided to a portion of the IC, step for determining a power saving operating voltage for the IC different than the nominal operating voltage, and step for storing an indication of the power saving operating voltage on the IC. The method also includes step for sensing a state of the IC, step for performing a first AVS operation on the voltage provided to the portion of the IC based on the power saving operating voltage and the sensed state of the IC under a first condition, and step for performing a second AVS operation on the voltage provided to the portion of the IC based on the power saving operating voltage independently of the sensed state of the IC under a second condition.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, step, operations, elements, and/or components, but do not preclude the presence or addition of one or more other features, integers, step, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
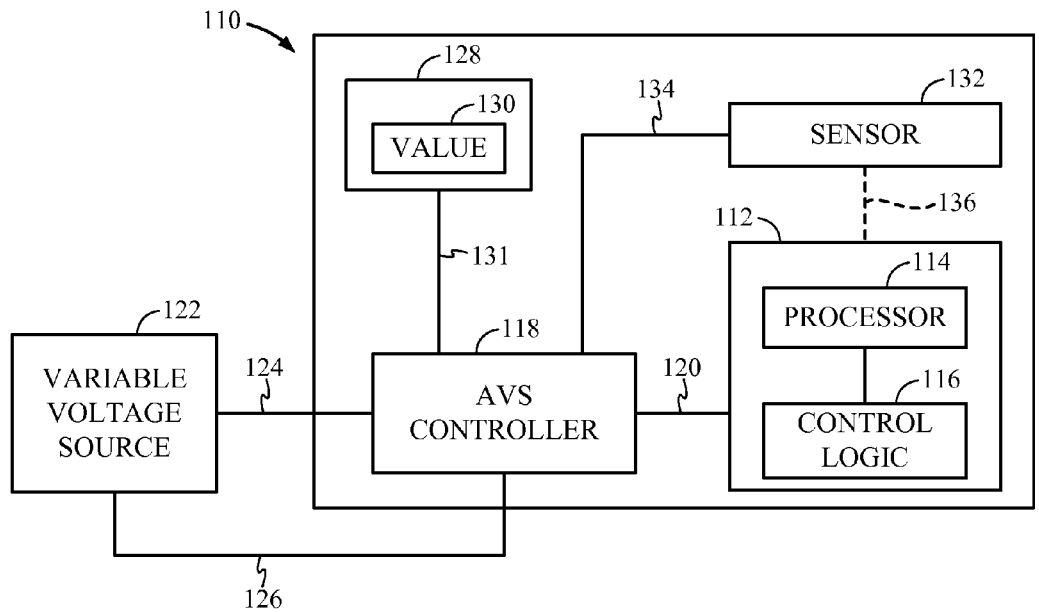
FIG. 1 is a schematic illustration of an integrated circuit according to an embodiment of the disclosure.

FIG. 1 shows an integrated circuit (IC) 110, which may comprise a portion of a system on chip (SoC) that includes a portion 112 where a processor 114 and control logic 116 are located. Power management for the IC 110 is provided by an adaptive voltage scaling (AVS) controller 118 that provides a voltage to the portion 112 by way of a first line 120. The AVS controller 118 receives current from a variable voltage source 122 via a second line 124 and sends control signals to the variable voltage source 122 via a third line 126 in order to control the voltage at which the current is supplied to the IC 110. The IC 110 also includes a non-volatile memory 128 storing a value 130 which may be programmed during the manufacture of the IC 110 and which may represent a lower or power saving voltage at which the IC 110 may operate. The non-volatile memory 128 may comprise, for example, an EPROM or a fuse bit into which the value 130 is stored in a permanent or semi-permanent manner.

The IC 110 also includes at least one sensor 132 which is configured to sense at least one state of the IC 110, which sensed state may include one or more of temperature, an operating voltage of the portion 112 of the IC 110 or an operating frequency of the processor 114 of the IC 110, and to provide an output signal indicative of the sensed state to the AVS controller 118 via a fourth line 134. When the at least one sensor 132 is configured to sense voltage or operating frequency, the at least one sensor 132 may also be connected to the portion 112 via an optional sensor line 136. The sensor line 136 is not needed when only temperature is being detected.

The AVS controller 118 reads the stored value 130 from the non-volatile memory 128 via a fifth line 131 and uses this stored value 130 to determine a baseline voltage to supply to the portion 112 of the IC 110 under most or all operating conditions. The stored value 130 may represent a voltage that should be supplied to the portion 112 or, alternately, may represent an offset from a nominal voltage at which the portion 112 is configured to operate. For example, the portion 112 of the IC 110 may include elements that are nominally rated to operate at 1.20 mV. However, during production testing of the IC 110, it may have been determined that the elements of portion 112 operate faster than specified at 1.20 mV and that these elements can operate in a desired manner at 1.15 mV. The value 130 stored in the non-volatile memory 128 thus may be either "1.15" to indicate the desired operating voltage or "−0.05" to indicate the offset from a nominal 1.20 mV operating voltage. This form of voltage control, wherein the AVS controller 118 controls the voltage supplied to the portion 112 of the IC 110 based on a value stored in the IC 110 may be referred to herein as "static control" or as a "second setting" of the AVS controller 118.

In addition to controlling the voltage provided to the portion 112 of the IC 110 based on the stored value 130, the AVS controller 118 has a first setting in which it may dynamically adjust or control the voltage supplied to the portion 112 based on a detected state of the IC 110. For example, as the temperature of the IC 110 increases, a lower voltage level may be sufficient to operate the processor 114 at a desired speed. The AVS controller 118 therefore may be configured to decrease the voltage supplied to the portion 112 as output signals from the at least one sensor 132 indicate a temperature increase and to increase the voltage supplied to the portion 112 as output signals from the at least one sensor 132 indicate a temperature decrease. There may be other situations wherein a sensed increase in temperature requires an increase in voltage, and the AVS controller 118 can be configured to perform such an adjustment as well. It is also known to change the voltage provided to the portion 112 depending on a voltage sensed in the portion 112 and/or based on the operating frequency of the processor 114 as sensed by the at least one sensor 132. In fact, the AVS controller 118 may be configured to perform any conventional voltage scaling process based on a stored value sensed by at least one sensor 132 when operating in this first, or dynamic, setting.

In a conventional AVS controller, the first and second settings are used at the same time. That is, a conventional AVS controller would use the value 130 stored in the non-volatile memory 128 to determine a voltage to supply to the portion 112 and then adjust this value as needed based on the state of the IC as sensed by the at least one sensor 132. Controlling voltage based on a stored value provides a certain degree of power savings by lowering the baseline operating voltage of the IC 110. Additional power savings are achieved by dynamically controlling voltage based on the state of the IC 110. However, controlling voltage based on sensed states requires processing power as well as some amount of time to perform calculations and/or retrieve data indicative of the appropriate adjustment to an operating voltage based on the condition being sensed. The present inventors have determined that under certain conditions, which may be operating states of the IC 110, the benefit of increased power savings is outweighed by the slower chip operation caused by the dynamic voltage determination process discussed above. Therefore, in the disclosed embodiment, the AVS controller 118 is configured to have two settings: a first setting in which dynamic voltage control is performed and a second setting in which only static voltage control is performed, for example, based on the value 130 stored in the non-volatile memory 128, independently of the state sensed by the at least one sensor 132. The AVS controller 118 will select one of these two settings based on a condition of the IC 110 or its environment.

The AVS controller 118 may operate in the first setting a majority of the time in order to power the IC 110 in an energy-efficient manner. However, under conditions where performance is deemed more important that reduced energy use, the AVS controller 118 may operate in the second setting. Conditions under which high performance is desirable include a boot condition wherein the IC 110 is executing a boot operation or start-up sequence. Dynamically controlling operating voltage during a boot sequence may prolong the boot sequence. Operating the IC 110 using the second setting, that is, without dynamic voltage control, may shorten the boot process and make the device embodying the IC 110 available for use sooner than if the dynamic voltage control were performed. While this approach uses slightly more energy than operation in the first setting, boot sequences typically constitute a small portion of the total operating time of a device, and the impact on total energy use of using the second setting during boot sequences is not significant.

The IC 110 may be said to operate in a high-performance mode when the processor 114 is operating at a given percentage of its maximum capacity, at or above 80 percent, for example. This could occur, for example, when the processor 114 is rendering a movie with sound as well as performing background control functions. In this high-performance mode, it may also be desirable to have the AVS controller 118 operate in the second setting and refrain from performing dynamic voltage control as long as the high-performance mode is selected. This is particularly true when the device is being powered by an external power source rather than by a battery. The existence of the high-performance mode may be determined based on a measurement of the degree of processor use or based on the selection of a known processor-intensive operation, such as displaying a video file, and the AVS controller 118 may use the second setting when a high-performance mode is required.

As discussed above, it may be generally desirable to operate the AVS controller 118 in the second setting during boot operations and when the IC 110 is running in a high-performance mode. However, there may be occasions when the AVS controller 118 should be maintained in the static, power conservation mode, (second setting) regardless of the operation being performed. For example, when the IC 110 is being powered by a battery, power conservation may be more desirable than performance. It is therefore possible for the AVS controller 118 to be configured such that it operates using the second setting at all times while the IC 110 is powered by a battery. Alternately, if the IC 110 is configured to monitor a remaining battery life, the AVS controller 118 may operate in the first setting when a significant amount of battery life remains and switch to the second setting when the battery has drained significantly and power savings becomes more desirable than performance.

Figure 2:
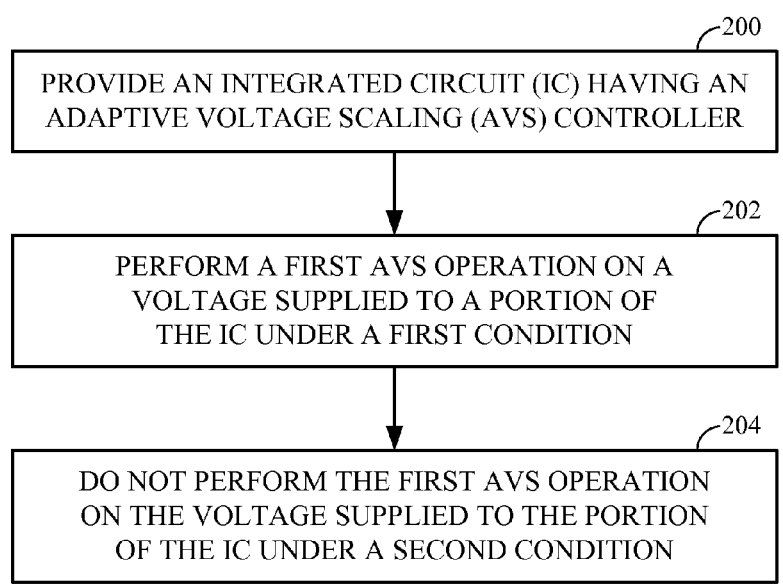
FIG. 2 is a flow chart illustrating a method according to an embodiment of the disclosure.

FIG. 2 illustrates a method according to an embodiment that includes a block 200 of providing an IC having an AVS controller, a block 202 of performing a first AVS operation on a voltage supplied to a portion of the IC under a first condition and a block 204 of not performing the first AVS operation on the voltage supplied to the portion of the IC under a second condition.

Figure 3:
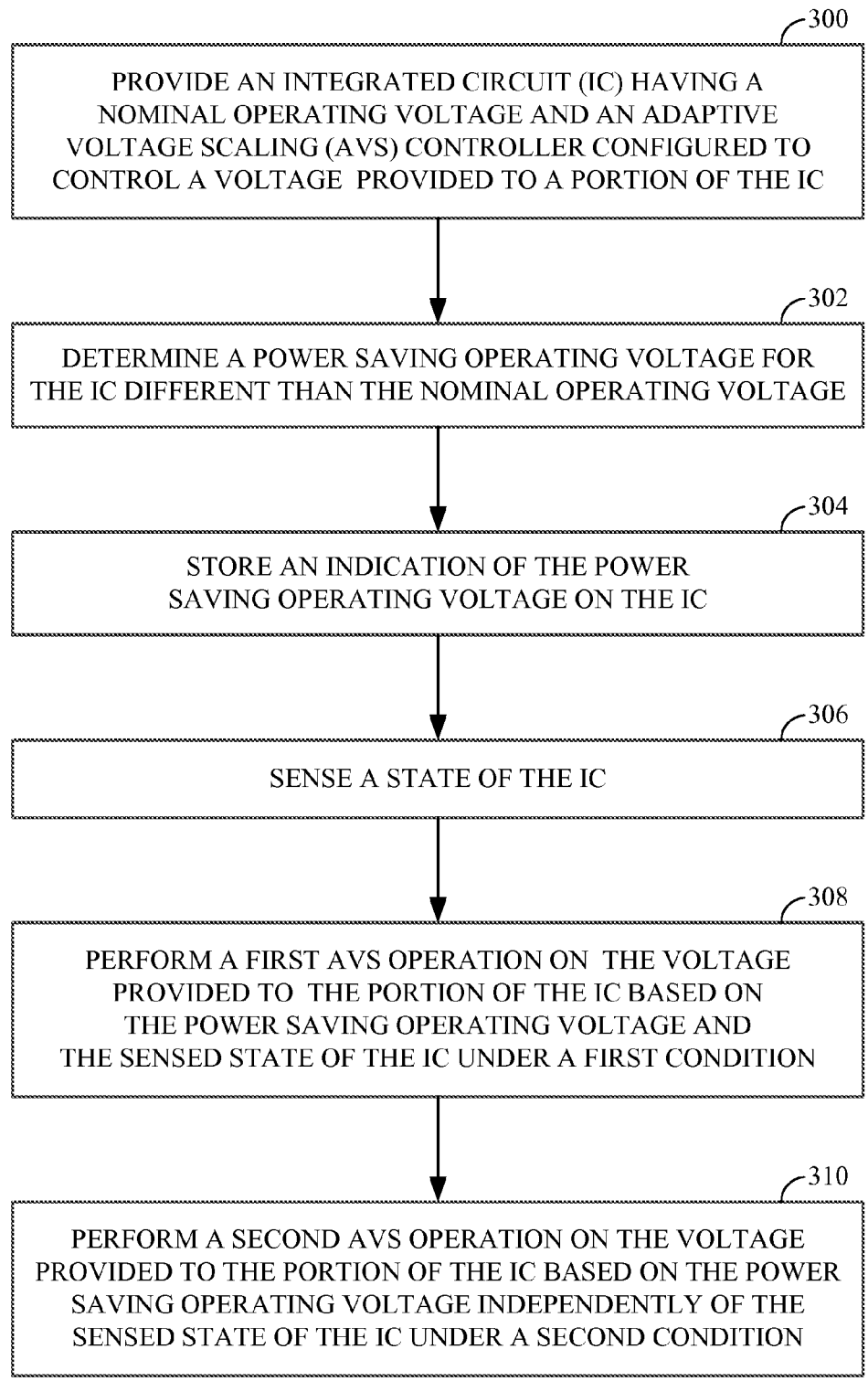
FIG. 3 is a flow chart illustrating another method according to an embodiment of the disclosure.

FIG. 3 illustrates a method according to another embodiment that includes a block 300 of providing an IC having a nominal operating voltage and an AVS controller configured to control a voltage provided to a portion of the IC and a block 302 of determining a power saving operating voltage for the IC different than the nominal operating voltage. The method also includes a block 304 of storing an indication of the power saving operating voltage on the IC and a block 306 of sensing a state of the IC. In addition, the method includes a block 308 of performing a first AVS operation on the voltage provided to the portion of the IC based on the power saving operating voltage and the sensed state of the IC under a first condition and a block 310 of performing a second AVS operation on the voltage provided to the portion of the IC based on the power saving operating voltage independently of the sensed state of the IC under a second condition.

Figure 4:
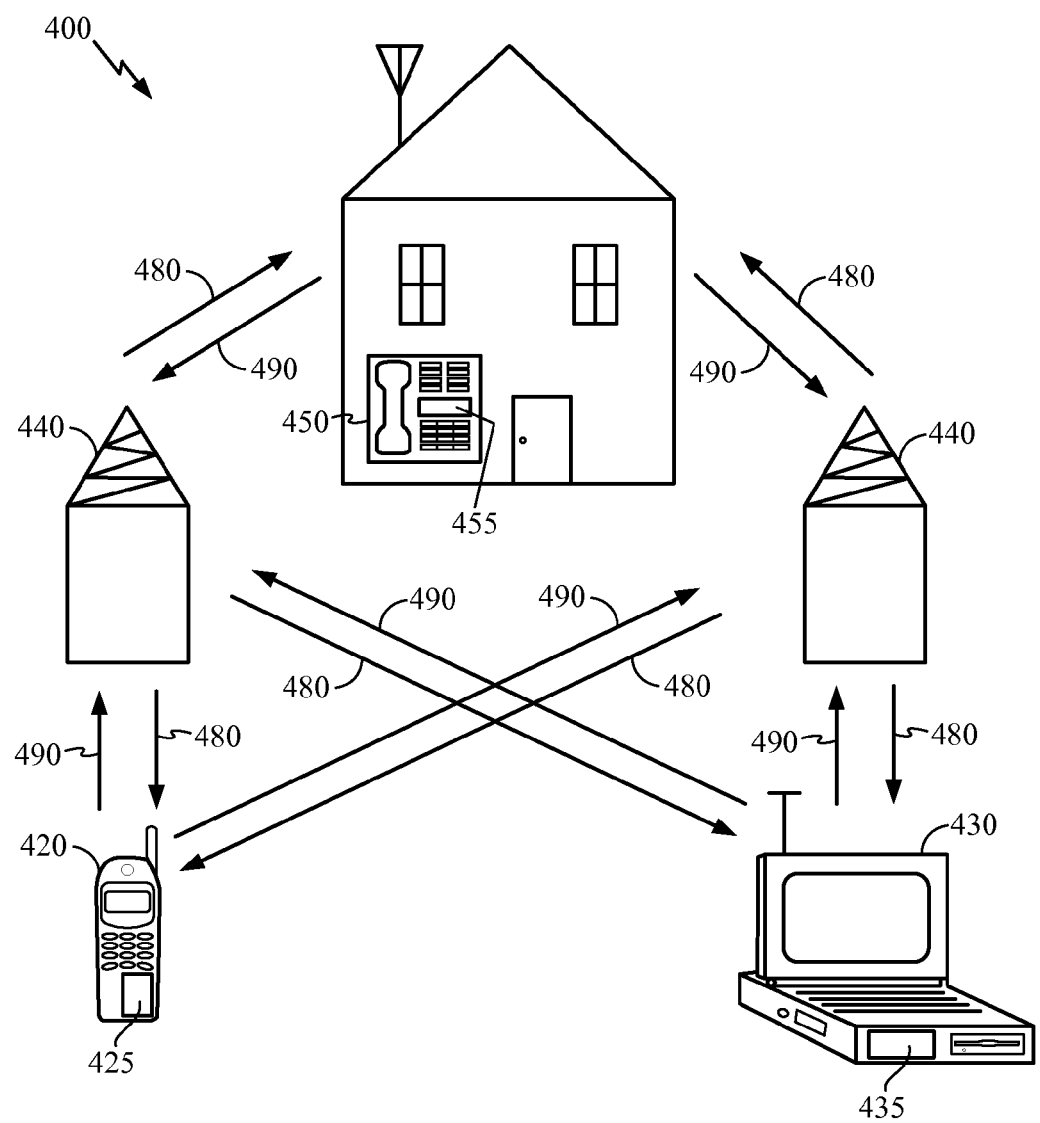
FIG. 4 is a schematic diagram of an exemplary wireless communication system in which embodiments of the disclosure may be used.

FIG. 4 illustrates an exemplary wireless communication system 400 in which one or more embodiments of the disclosure may be advantageously employed. For purposes of illustration, FIG. 4 shows three remote units 420, 430, and 450 and two base stations 440. It will be recognized that conventional wireless communication systems may have many more remote units and base stations. The remote units 420, 430, and 450 include integrated circuit or other semiconductor devices 425, 435 and 455, which are among embodiments of the disclosure as discussed further below. FIG. 4 shows forward link signals 480 from the two base stations 440 and the remote units 420, 430, and 450 and reverse link signals 490 from the remote units 420, 430, and 450 to the two base stations 440.

In FIG. 4, the remote unit 420 is shown as a mobile telephone, the remote unit 430 is shown as a portable computer, and the remote unit 450 is shown as a fixed location remote unit in a wireless local loop system. For example, the remote units may be any one or combination of a mobile phone, hand-held personal communication system (PCS) unit, portable data unit such as a personal data assistant (PDA), navigation device (such as GPS enabled devices), set top box, music player, video player, entertainment unit, fixed location data unit such as meter reading equipment, or any other device that stores or retrieves data or computer instructions, or any combination thereof. Although FIG. 4 illustrates remote units according to the teachings of the disclosure, the disclosure is not limited to these exemplary illustrated units. Embodiments of the disclosure may be suitably employed in any device having active integrated circuitry including memory and on-chip circuitry for test and characterization.

The foregoing disclosed devices and functionalities or any combination thereof may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The semiconductor chips can be employed in electronic devices, such as described hereinabove.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable medium embodying a method for implementation. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of power management comprising:
providing an integrated circuit (IC) having an adaptive voltage scaling (AVS) controller;
performing a first AVS operation that uses a signal indicating at least one sensed state of the IC to control a voltage supplied to a portion of the IC using the AVS controller under a first condition; and
controlling the voltage supplied to the portion of the IC without using the signal indicating the at least one sensed state of the IC under a second condition.

2. The method of claim 1, wherein the first AVS operation is a dynamic adjustment of the voltage supplied to the portion of the IC based on the signal indicating the at least one sensed state of the IC.

3. The method of claim 1, wherein the at least one sensed state of the IC comprises a temperature of the IC or a temperature of an environment of the IC.

4. The method of claim 1, wherein the at least one sensed state of the IC comprises a temperature or a frequency or a voltage of the IC.

5. The method of claim 1, including performing a second AVS operation to control the voltage supplied to the portion of the IC using the AVS controller under the second condition.

6. The method of claim 5, wherein the second AVS operation comprises setting a baseline operating voltage for the portion of the IC based on a value stored in a non-volatile memory of the IC.

7. The method of claim 1, wherein the first AVS operation comprises a dynamic adjustment of the voltage supplied to the portion of the IC based on the signal indicating the at least one sensed state of the IC and a second AVS operation comprises setting a baseline operating voltage for the portion of the IC based on a value stored in the IC.

8. The method of claim 1, including setting a baseline operating voltage for the portion of the IC based on a value stored in the IC and wherein the first AVS operation is a dynamic adjustment of the baseline operating voltage based on the signal indicating the at least one sensed state of the IC.

9. The method of claim 8, wherein the first condition comprises an operating state of the IC.

10. The method of claim 8, wherein the first condition comprises one or more of the IC being power by an external power source or having significant remaining battery life.

11. The method of claim 8, wherein the second condition comprises the IC operating in a high-performance mode.

12. The method of claim 8, wherein the second condition comprises one or more of the IC operating in a power conservation mode or the IC being powered by a battery.

13. The method of claim 8, wherein the second condition comprises the IC performing a boot operation.

14. The method of claim 1, wherein the second condition comprises a processor of the IC operating at more than a given percentage of a maximum capacity of the processor.

15. An integrated circuit (IC) comprising:
an adaptive voltage scaling (AVS) controller configured to control a voltage supplied to a portion of the IC; and
at least one sensor configured to sense at least one state of the IC and to provide an output signal indicative of the at least one sensed state to the AVS controller,
wherein the AVS controller is further configured to operate in a first setting in which the AVS controller is configured to use the output signal to control the voltage and a second setting in which the AVS controller is configured to control the voltage without using the output signal.

16. The IC of claim 15, wherein in the second setting the AVS controller is configured to control the voltage based on a value stored in a non-volatile memory of the IC.

17. The IC of claim 15, wherein the at least one state of the IC is a temperature of the IC or a temperature of an environment of the IC.

18. The IC of claim 15, wherein the at least one state of the IC is a temperature or a frequency or a voltage of the IC.

19. The IC of claim 15, wherein the AVS controller is configured to select the first setting under a first condition and to select the second setting under a second condition.

20. The IC of claim 19, wherein the first condition comprises an operating state of the IC.

21. The IC of claim 19, wherein the first condition comprises one or more of the IC being power by an external power source or having significant remaining battery life.

22. The IC of claim 19, wherein the second condition comprises the IC operating in a high-performance mode.

23. The IC of claim 19, wherein the second condition comprises one or more of the IC operating in a power conservation mode or the IC being powered by a battery.

24. The IC of claim 19, wherein the second condition comprises the IC performing a boot operation.

25. The IC of claim 19, wherein the second condition comprises a processor of the IC operating at more than a given percentage of a maximum capacity of the processor.

26. The IC of claim 15 integrated into at least one semiconductor die.

27. A device selected from a group consisting of a set top box, a music player, a video player, an entertainment unit, a navigation device, a communications device, a personal digital assistant (PDA), a fixed location data unit, and a computer, including the integrated circuit of claim 15.

28. A method comprising:
providing an integrated circuit (IC) having a nominal operating voltage and an adaptive voltage scaling (AVS) controller configured to control a voltage provided to a portion of the IC;
determining a power saving operating voltage for the IC different than the nominal operating voltage;

storing an indication of the power saving operating voltage on the IC;
sensing a state of the IC;
performing a first AVS operation on the voltage provided to the portion of the IC based on the power saving operating voltage and the sensed state of the IC under a first condition; and
performing a second AVS operation on the voltage provided to the portion of the IC based on the power saving operating voltage without using the sensed state of the IC under a second condition.

29. A method of power management comprising:
step for providing an integrated circuit (IC) having an adaptive voltage scaling (AVS) controller;
step for performing a first AVS operation that uses a signal indicating at least one sensed state of the IC to control a voltage supplied to a portion of the IC using the AVS controller under a first condition; and
step for controlling the voltage supplied to the portion of the IC without using the signal indicating the at least one sensed state of the IC under a second condition.

30. The method of claim 29 including step for performing a second AVS operation to control the voltage supplied to the portion of the IC using the AVS controller under the second condition.

31. The method of claim 29 including step for setting a baseline operating voltage for the portion of the IC based on a value stored in the IC and wherein the first AVS operation is a dynamic adjustment of the baseline operating voltage based on the signal indicating the at least one sensed state of the IC.

32. The method of claim 29, wherein the first AVS operation is a dynamic adjustment of the voltage supplied to the portion of the IC based on the signal indicating the at least one sensed state of the IC or an environment of the IC and wherein the at least one sensed state of the IC comprises a temperature or a frequency or a voltage of the IC.

33. An integrated circuit (IC) having an adaptive voltage scaling (AVS) controller and comprising
means for performing a first AVS operation that uses a signal indicating at least one sensed state of the IC to control a voltage supplied to a portion of the IC using the AVS controller under a first condition; and
means for preventing the performance of the first AVS operation that uses the signal indicating the at least one sensed state of the IC on the voltage supplied to the portion of the IC under a second condition.

34. An integrated circuit (IC) comprising:
means for controlling a voltage supplied to a portion of the IC;
means for sensing at least one state of the IC; and
means for providing an output signal indicative of the at least one sensed state to the means for controlling, wherein the means for controlling is configured to operate in a first setting in which the means for controlling is configured to use the output signal to control the voltage and a second setting in which the means for controlling is configured to control the voltage without using the output signal.

35. The integrated circuit of claim 34, wherein the means for controlling comprises an adaptive voltage scaling (AVS) controller.

36. A method comprising:
step for providing an integrated circuit (IC) having a nominal operating voltage and an adaptive voltage scaling (AVS) controller configured to control a voltage provided to a portion of the IC;
step for determining a power saving operating voltage for the IC different than the nominal operating voltage;
step for storing an indication of the power saving operating voltage on the IC;
step for sensing a state of the IC;
step for performing a first AVS operation on the voltage provided to the portion of the IC based on the power saving operating voltage and the sensed state of the IC under a first condition; and
step for performing a second AVS operation on the voltage provided to the portion of the IC based on the power saving operating voltage without using the sensed state of the IC under a second condition.

37. An article comprising a non-transitory computer readable medium having stored thereon instructions that, if executed, cause an adaptive voltage scaling (AVS) controller of an integrated circuit (IC) to perform a first AVS operation that uses a signal indicating at least one sensed state of the IC to control a voltage supplied to a portion of the IC using the AVS controller under a first condition to control the voltage supplied to the portion of the IC without using the signal indicating the at least one sensed state of the IC under a second condition.

38. The article of claim 37, wherein the first AVS operation is a dynamic adjustment of the voltage supplied to the portion of the IC based on the signal indicating the at least one sensed state of the IC, and wherein the at least one sensed state of the IC comprises a temperature or a frequency or a voltage of the IC.

39. The article of claim 37, wherein the voltage supplied to the portion of the IC under the second condition comprises a baseline operating voltage based on a value stored in a non-volatile memory of the IC.

40. The IC of claim 15, wherein the AVS controller is further configured to receive current from a variable voltage source and send one or more control signals to the variable voltage source to control the voltage at which the current is supplied to the IC.

41. The IC of claim 16, wherein the value stored in the non-volatile memory represents a baseline voltage to supply to the portion of the IC or an offset from a nominal voltage at which the portion of the IC is configured to operate.

42. The IC of claim 16, wherein in the first setting the AVS controller is configured to adjust the value stored in the non-volatile memory according to the output signal from the at least one sensor and control the voltage according to the adjusted value.

43. The IC of claim 15, further comprising:
a non-volatile memory configured to store a value that represents a power saving voltage at which the IC can operate.

44. The IC of claim 15, wherein the AVS controller is further configured to:
read a stored value from a non-volatile memory;
adjust the stored value according to the output signal from the at least one sensor and control the supplied voltage according to the adjusted value in the first setting; and
control the supplied voltage according to the stored value only in the second setting.

* * * * *